US012743642B2

(12) United States Patent
Marinescu et al.

(10) Patent No.: US 12,743,642 B2
(45) Date of Patent: Sep. 22, 2026

(54) DECISION OPTIMIZATION UTILIZING TABULAR DATA

(71) Applicant: International Business Machines Corporation, Armonk, NY (US)

(72) Inventors: Radu Marinescu, Dublin (IE); Akihiro Kishimoto, Tokyo (JP); Paulito Palmes, Dublin (IE); Martin Wistuba, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1101 days.

(21) Appl. No.: 17/363,542

(22) Filed: Jun. 30, 2021

(65) Prior Publication Data

US 2023/0004843 A1 Jan. 5, 2023

(51) Int. Cl.

*G06N 20/00* (2019.01)
*G06F 16/22* (2019.01)
*G06F 18/21* (2023.01)
*G06N 5/045* (2023.01)

(52) U.S. Cl.

CPC ......... *G06N 5/045* (2013.01); *G06F 16/2282* (2019.01); *G06F 18/2185* (2023.01); *G06N 20/00* (2019.01)

(58) Field of Classification Search

CPC ..... G06N 5/045; G06N 3/092; G06F 18/2185
See application file for complete search history.

(56) References Cited

U.S. PATENT DOCUMENTS 6,934,931 B2 8/2005 Plumer
8,001,063 B2 8/2011 James
8,161,165 B2 4/2012 Horvitz
8,285,581 B2 10/2012 Abe
8,813,176 B2 8/2014 Jones
9,298,172 B2 * 3/2016 Tesauro .................. G06N 5/02

(Continued)

FOREIGN PATENT DOCUMENTS

CN 112541585 A * 3/2021

OTHER PUBLICATIONS

"Make Faster, Smarter Decisions by Combining Machine Learning and Decision Optimization" Open Data Science Conference 2018, Abstract, 3 pages.

(Continued)

*Primary Examiner* — David R Vincent
(74) *Attorney, Agent, or Firm* — Lily Neff

(57) ABSTRACT

A computer-implemented method for automated policy decision making optimization is disclosed. The computer-implemented method includes creating a dataset from a tabular database, wherein the dataset includes one or more columns selected as state variables, a column selected as action variables, and a column selected as reward variables. The computer-implemented method further includes determining a candidate function approximator Q based on applying at least one state variable, one action variable, and one reward variable to a trained regression model. The computer-implemented method further includes learning a decision policy based on applying the candidate function approximator Q to a reinforcement learning algorithm. The computer-implemented method further includes determining, based on the learned decision policy, an expected reward.

15 Claims, 6 Drawing Sheets

(56) References Cited

U.S. PATENT DOCUMENTS

| | | | | |
|---|---|---|---|---|
| 10,922,092 | B2 | 2/2021 | Nag | |
| 10,922,992 | B2 | 2/2021 | Kur et al. | |
| 2019/0339087 | A1 | 11/2019 | Jindal | |
| 2020/0034701 | A1* | 1/2020 | Ritter | G06F 9/5005 |
| 2020/0065704 | A1* | 2/2020 | Nag | G06N 5/01 |

OTHER PUBLICATIONS

Mell et al., "The NIST Definition of Cloud Computing", Recommendations of the National Institute of Standards and Technology, NIST Special Publication 800-145, Sep. 2011, 7 pages.

Van Den Heever, Susara, "Make Better, Faster, Smarter Decisions by combing ML and Decision Optimization", YouTube, Sep. 4, 2018, 2 pages.

Xu et al., "A Reinforcement Learning Approach to Autonomous Decision Making of Intelligent Vehicles on Highways", IEEE Transactions on Systems, Man, and Cybernetics: Systems, Dec. 2018, DOI: 10.1109/TSMC.2018.2870983, 15 pages.

* cited by examiner

| NO | INVENTORY | DEMAND | STOCKOUT | BALANCE | COST | ORDER |
|---|---|---|---|---|---|---|
| 1 | 23 | 35 | 12 | 0 | 120+72 | 72 |
| 2 | 72 | 35 | 0 | 37 | 37+23 | 23 |
| 3 | 60 | 26 | 0 | 34 | 34+35 | 35 |
| 4 | 69 | 61 | 0 | 8 | 8+26 | 26 |

DECISION OPTIMIZATION UTILIZING TABULAR DATA

BACKGROUND

The present invention relates generally to the field of decision optimization, and in particular, automated policy decision making optimization using tabular data.

Policy optimization is an effective reinforcement learning approach to solve continuous and discrete control tasks. Policy optimization recommends the best possible action to take based on a set of input information. Tabular data is structured into rows and columns, wherein each row represents a single record or data point and each column contains information pertaining a record or data point. Tabular data enables information to be organized and accessed in a meaningful manner for information processing and decision making.

SUMMARY

According to one embodiment of the present invention, a computer-implemented method for automated policy decision making optimization is disclosed. The computer-implemented method includes creating a dataset from a tabular database, wherein the dataset includes one or more columns selected as state variables, a column selected as action variables, and a column selected as reward variables. The computer-implemented method further includes determining a candidate function approximator Q based on applying at least one state variable, one action variable, and one reward variable to a trained regression model. The computer-implemented method further includes learning a decision policy based on applying the candidate function approximator Q to a reinforcement learning algorithm. The computer-implemented method further includes determining, based on the learned decision policy, an expected reward.

According to another embodiment of the present invention, a computer program product for automated policy decision making optimization is disclosed. The computer program product includes one or more computer readable storage media and program instructions stored on the one or more computer readable storage media. The program instructions include instructions to create a dataset from a tabular database, wherein the dataset includes one or more columns selected as state variables, a column selected as action variables, and a column selected as reward variables. The program instructions further include instructions to determine a candidate function approximator Q based on applying at least one state variable, one action variable, and one reward variable to a trained regression model. The program instructions further include instructions to learn a decision policy based on applying the candidate function approximator Q to a reinforcement learning algorithm. The program instructions further include instructions to determine, based on the learned decision policy, an expected reward.

According to another embodiment of the present invention, a computer system for automated policy decision making optimization is disclosed. The computer system includes one or more computer processors, one or more computer readable storage media, and computer program instructions, the computer program instructions being stored on the one or more computer readable storage media for execution by the one or more computer processors. The program instructions include instructions to create a dataset from a tabular database, wherein the dataset includes one or more columns selected as state variables, a column selected as action variables, and a column selected as reward variables. The program instructions further include instructions to determine a candidate function approximator Q based on applying at least one state variable, one action variable, and one reward variable to a trained regression model. The program instructions further include instructions to learn a decision policy based on applying the candidate function approximator Q to a reinforcement learning algorithm. The program instructions further include instructions to determine, based on the learned decision policy, an expected reward.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
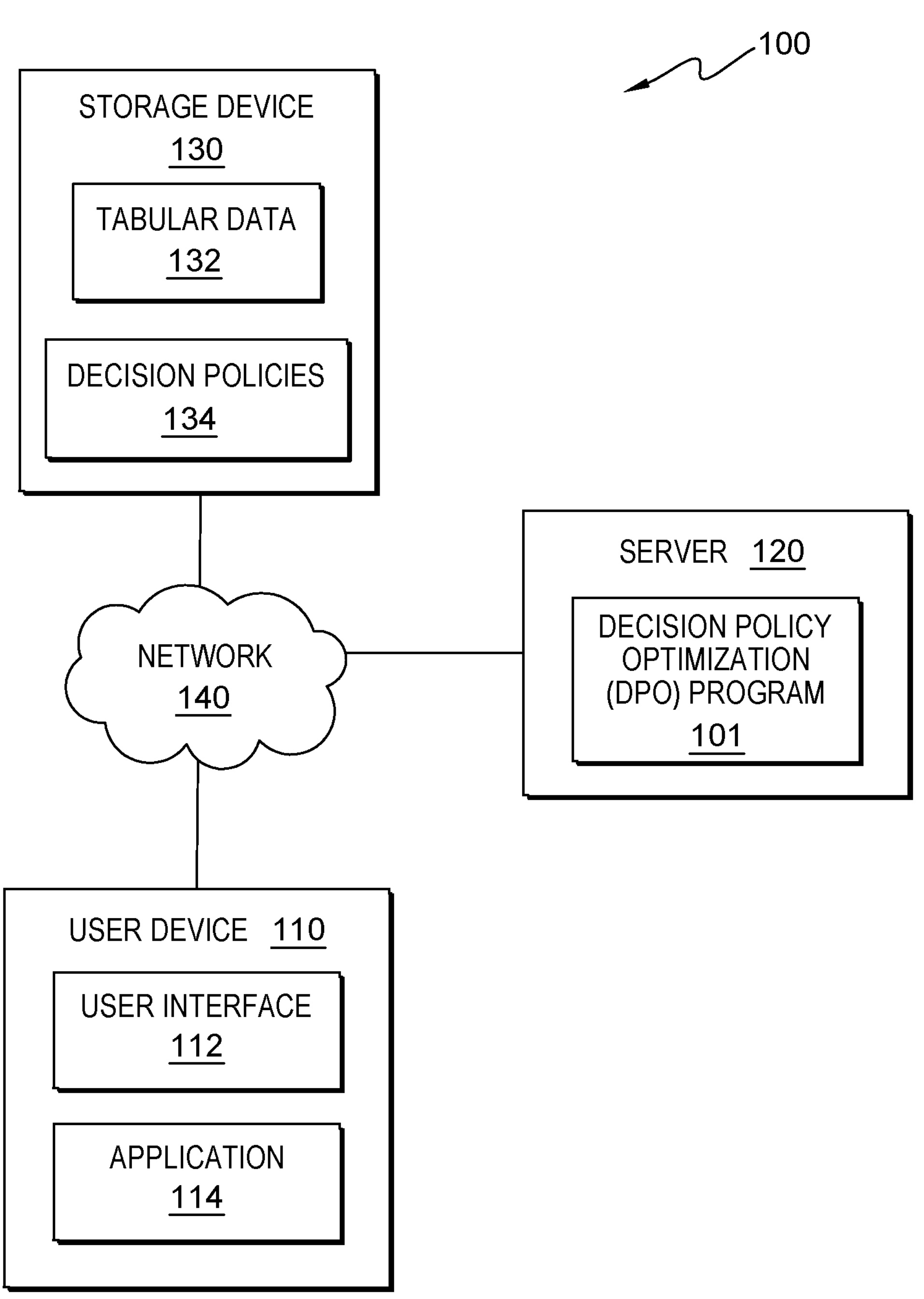
FIG. 1 is a block diagram of a network computing environment for learning optimal decision policies from tabular data, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of decision optimization, and in particular, automated policy decision making optimization using tabular data.

Policy optimization from tabular data produces an optimized decision based on important information regarding an input. Oftentimes, policy optimization uses machine learning based decision support systems which learn a model that predicts the value of a target variable. However, current policy optimization methods are unable to provide a decision policy that recommends the next best action, decision, or sequence of next best actions or decisions. Deep reinforcement learning combines artificial neural networks with a reinforcement learning architecture that enables software-defined agents to learn the best actions possible in virtual environment in order to attain their goals. Neural net architectures are complex structures which take in multiple inputs to produce a single output. However, deep reinforcement learning and neural net architectures assume a particular neural network architecture for the Q-function. The Q-function is also known as the action-value function. Q(s, a) is the expected return (where the return is defined as the accumulated discounted reward over an infinite time horizon) that can be obtained in state (s) by applying action (a). Oftentimes, a Q-function is hand-crafted by an expert or simulator. Embodiments of the present invention recognize the need for a decision policy which does not require an expert or simulator to determine a Q-function.

Embodiments of the present invention further recognize the need for the capability to automatically generate decision policies instead of point value predictions. Embodiments of the present invention generate an optimized policy based on a given dataset, in which the optimized policy includes one or more optimal actions to take. In an embodiment, the present invention provides for the capability to automatically identify state variables and corresponding actions. In an embodiment, the present invention provides for the capability to use current state and action variables to automatically learn a decision policy from a dataset. In an embodiment, the present invention provides for the capability to evaluate generated decision policies to identify the most optimal decision policy from a set of generated decision policies.

Embodiments of the present invention automatically generate an optimized decision policy from raw tabular data with minimal, to no user input. Embodiments of the present invention further iterate over multiple function approximator candidates. For each iteration, the present invention learns a decision policy and determines an optimal decision policy at the end. Embodiments of the present invention learn an immediate reward model R(s,a) that predicts the immediate reward when applying action "a" in state "s," as well as a transition model M(s,a) that predicts the next state "s'" when applying action "a" in state "s."

Embodiments of the present invention improve upon the foregoing deficiencies of decision optimization by constructing candidates of Q-functions from the data. Embodiments of the present invention perform a systematic search over the possible partitions of the input columns x into state (S) variables, action (A) variables and reward (R) variables in order to determine a policy that is relevant to the decision maker or decision problem to be solved. This search procedure is done when the decision maker does not specify the state, action and reward columns in the dataset. By selecting a subset of columns to act as state, action, and reward variables.

Embodiments of the present invention perform meta-learning of the Q-function, together with meta-learning of the environment of a given set of tabular data), with respect to regression learning algorithms. Embodiments of the present invention provide for the accommodation of diverse domains without requiring a user to manually design or select the desired function approximator Q (e.g., a neural net in the case of a Deep Q-Network (DQN)).

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment for determining optimized decisions using tabular data, generally designated 100, in accordance with at least one embodiment of the present invention. In an embodiment, network computing environment 100 may be provided by cloud computing environment 50, as depicted and described with reference to FIG. 5, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 3.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control decision policy optimization (DPO) program 101. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user inputs tabular data or other relevant data via application 114 or user interface 112.

Application 114 can be representative of one or more applications (e.g., an application suite) that operate on user device 110. In an embodiment, application 114 is representative of one or more applications (e.g., social media applications, web conferencing applications, and email applications) located on user device 110. In various example embodiments, application 114 can be an application that a user of user device 110 utilizes to input tabular data and view the optimum decision. In an embodiment, application 114 can be a client-side application associated with a server-side application running on server 120 (e.g., a client-side application associated with a decision policy optimization program 101). In an embodiment, application 114 can operate to perform processing steps of decision policy optimization program 101 (i.e., application 114 can be representative of decision policy optimization program 101 operating on user device 110).

Server 120 includes DPO program 101. Server 120 is configured to provide resources to various computing devices, such as user device 110. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

Figure 5:
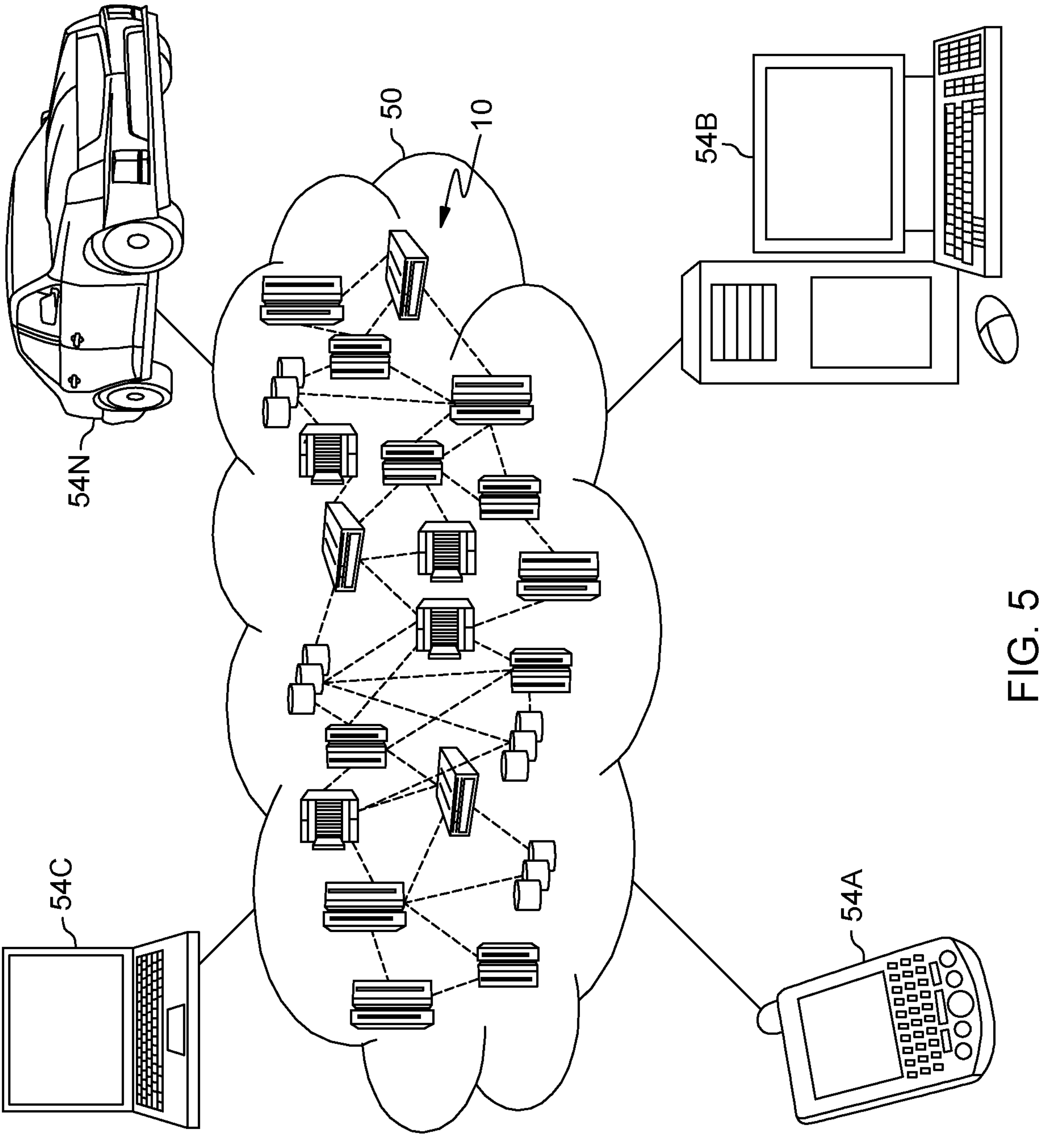
FIG. 5 is a block diagram depicting a cloud computing environment 50 in accordance with at least one embodiment of the present invention.

Server 120 may include components as depicted and described in detail with respect to cloud computing node 10, as described in reference to FIG. 5, in accordance with at least one embodiment of the present invention. Server 120 may include components, as depicted, and described in detail with respect to computing device 300 of FIG. 3, in accordance with at least one embodiment of the present invention.

In various embodiments, storage device 130 is a secure data repository for persistently storing audio notification tones utilized by various applications and user devices of a user, such as user device 110. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, storage device 130 includes tabular data 132 and decision policies 134. In an embodiment, tabular data 132 includes tabular data or any data which can be put into tabular form. In an embodiment, tabular data 132 is stored in a relational database. A relational database is a database which can identify and access data in relation to another piece of data in the database. Relational databases are often organized in tables. It should be noted that although embodiments of the present invention are directed towards automatically generating optimized decision policies based on tabular data stored in a relational or sequential (SQL) database, any type of data structure and database structure may be used to practice the invention. For example, in alternative embodiments, the automatic generation of optimized decision polices may be accomplished using data stored in a hierarchical database, object-oriented database, and non-relational or NoSQL database.

In an embodiment, decision policies 134 include a dynamic set of rules for automatically determining optimized decision or action(s). In an embodiment, decision policies 134 include a dynamic set of rules from a reinforcement learning algorithm that learns one or more policies. In an embodiment, decision policies 134 include information describing different decision-making actions that DPO program 101 should generate depending on the circumstances or tabular data input. For example, decision policies 134 may include a different set of rules for how and when to determine an optimum decision depending on what type of setting the DPO program 101 is being used in. For example, decision policies 134 may include one set of rules for if DPO program 101 is analyzing the stock market verses if the DPO program 101 is analyzing inventory status of a warehouse.

In an embodiment, DPO program 101 may be configured to access various data sources, such as tabular data 132, that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, DPO program 101 enables the authorized and secure processing of personal data. In an embodiment, DPO program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, DPO program 101 provides information regarding personal data and the nature (e.g., type, scope, purpose, duration, etc.) of the processing. In an embodiment, DPO program 101 provides a user with copies of stored personal data. In an embodiment, DPO program 101 allows for the correction or completion of incorrect or incomplete personal data. In an embodiment, DPO program 101 allows for the immediate deletion of personal data.

In an embodiment, DPO program 101 utilizes Auto Machine Learning (AutoML) system to automatically determine and execute an optimum decision or action(s). AutoML is a variation of automated machine learning which extends the automation of model building towards automation of the full life cycle of a machine learning model. It applies intelligent automation to the task of building predictive machine learning models by preparing data for training, identifying the best type of model for the given data, then choosing the features, or columns of data, that best support the problem the model is solving. For example, the AutoML may be IBM's AutoAI System. While reference is made to IBM-specific hardware and/or software components, it should be understood that aspects of the present invention may be applied equally to other machine learning technologies. Finally, automation tests a variety of tuning options to reach the best result as it generates, then ranks, model-candidate pipelines. The best performing pipelines can be put into production to process new data, and deliver predictions based on the model training.

In an embodiment, DPO program 101 automatically generates, as an output, an optimized decision policy based on tabular data. In an embodiment, DPO program 101 selects a subset of columns as state variables, a column as an action variable, and a column as a reward variable. In an embodiment, selection of the state, action, and reward variables is done iteratively. In an embodiment, a function approximator Q is learned from the selected columns acting as state variables, an action variable, and a reward variable, and the function approximator Q is applied to a reinforcement learning algorithm to derive an optimal decision policy. In an embodiment, the function approximator Q(s, a) is selected from the set of candidates based on a performance metric. A performance metric measures the behavior, activities, or performance of an activity or business. In an embodiment, a function approximator Q function Q(s, a) is learned from the selected columns acting as state variables, an action variable, and a reward variable, and the function approximator function Q(s, a) is applied to a reinforcement learning algorithm to derive an optimal decision policy. In an embodiment, the Q-function Q(s, a) also known as the action-value function, is the expected return (where the return is defined as the accumulated discounted reward over an infinite time horizon) that can be obtained in state (s) by applying action (a). In an embodiment, a reinforcement learning algorithm is a Q-learning algorithm. Q-learning is a model-free reinforcement learning algorithm to learn the value of an action in a particular state. It does not require a model of the environment, and it can handle problems with stochastic transitions and rewards without requiring adaptations.

In an embodiment, DPO program 101 receives a tabular dataset from generated from tabular data 132. In an embodiment, the tabular dataset is structured data organized in a tabular form. In an embodiment, the tabular dataset is formed from an initial set of unstructured data that DPO program 101 organizes into a structured, tabular form. In an embodiment, DPO program 101 determines a state, action, and one or more reward variables. A state variable is one of the set of variables from the tabular dataset used to describe the mathematical "state" of a dynamical system. The state of a system is used to determine an optimal decision policy. In an embodiment, a state variable (S) is one or more variables from the tabular dataset. In an embodiment, the user selects one or more state variables. In an embodiment, the action variable is selected by the user. An action variable includes the action to be taken for an optimum output. For example, if a tabular dataset for the inventory in a warehouse includes the inventory type, demand, stockout, and balance as state variables, the action may be whether to order more inventory. The reward variable is the reward from the optimal decision. For example, for a tabular dataset associated with inventory in a warehouse, the least expensive cost for purchasing the inventory would be the reward. In an embodiment, the state and action variables are known and DPO program 101 determines the reward variable. In an embodiment, the state and reward variables are known and DPO program 101 determines the action variable.

In an embodiment, DPO program 101 generates one or more decisions. In an embodiment, DPO program 101 ranks the decisions based on one or more learned decision policies 134. In an embodiment, DPO program 101 determines an optimal decision based on one or more learned decision policies 134.

In an embodiment, DPO program 101 automatically generates, as an output, an optimized decision policy based on tabular data received as an input. As an example, let X be the set of variables corresponding to the columns in dataset (D). Based on the dataset (D), state (S), action (A), and reward (R) variables are selected from X. For simplicity and without loss of generality, we assume that $S_i$ includes a set of variables, and $A_i$ and $R_i$ are single variables. However, in other instances, $A_i$ and $R_i$ may be include a set of variables or any possible combinations thereof. In an embodiment, DPO program 101 automatically selects that state (S), action (A), and reward (R) variables from X. In an alternative embodiment, a user selects the state (S), action (A), and reward (R) variables from X. In an embodiment, DPO program 101 further generates a state vector ($S_i$), an action vector ($A_i$), and a reward vector ($R_i$) based on the dataset (D).

In an embodiment, $S_j$, $A_j$, and $R_j$ are the previous set of state, action, and reward columns. In an embodiment, DPO program 101 automatically generates $S_i$, $A_i$, and $R_i$, which are different from the previous set of data. In an embodiment, $S_i$, $A_i$, and $R_i$ are sets or vectors of columns or variables in the dataset. In an embodiment, a column is a variable. For example, if $S_i$ is a single element, then $S_i$ is just a variable.

In an embodiment, DPO program 101 selects variables $S_i$, $A_i$, and $R_i$ based on a previous set of variables $S_j$, $A_j$, and $R_j$. In an embodiment, if $S_j$, $A_j$, and $R_j$ are empty, then $S_i$ is a random subset of X, $A_i$ is a random variable in X, but not in $S_i$, and $R_i$ is a numerical variable in X, but not in $S_i$ and a different numerical variable than $A_i$. In an embodiment, if $S_j$, $A_j$, and $R_j$ are not empty, then $S_i$=$S_j$, where with a probability of 0.5 or greater, a variable is selected from X that is not in $S_j$ and is different from $A_j$ and $R_j$ and added to $S_i$. Else, if a probability of less than 0.5, a random variable is selected from $S_i$ and removed. In an embodiment, if $S_j$, $A_j$, and $R_j$ are not empty, then $S_i$=$S_j$, where with a probability of 0.5 or greater, a variable $A_i$ is selected from X that is not in $S_i$ and different from $A_j$. Else, if a probability of less than 0.5, $A_i$=$A_j$. In an embodiment, if $S_j$, $A_j$, and $R_j$ are not empty, then $S_i$=$S_j$, where with a probability of 0.5 or greater, a numerical variable $R_i$ is selected from X that is not in $S_i$ and different from $A_i$. Else, if a probability of less than 0.5, $R_i$=$R_j$.

In an embodiment, DPO program 101 generates a set of k candidate Q-functions ($Q_1 \ldots Q_k$) with scope (Si, Ai). In an embodiment, DPO program 101 generates a set of k environments ($E_j \ldots E_k$), where each Ej consists of an immediate reward model Rj(Si,Ai) and a transition model Mj(Si,ai). In an embodiment, a trained immediate reward model R(s,a) or Rj(Si,Ai) predicts the immediate reward when applying action (A) in state (S). In an embodiment, the trained immediate reward model can be selected form a set of candidate models based on a performance metric (e.g., accuracy). In an embodiment, for each Q-function $Q_j$, (where j=1 . . . k), DPO program 101 utilizes a Reinforcement Learning (RL) algorithm, such as a DQN, with Q-function $Q_j$ and environment $E_j$ to learn a policy $P_{ij}$. In an embodiment, a neural network (NN) having Q-function $Q_j$ (NN $Q_j$) that approximates the action-value function is trained. In an embodiment, DPO program 101 determines an expected return $R_{ij}$ of $P_{ij}$ when evaluated with respect to a subset D' of database D. In an embodiment, if $R_{ij}$ is an improvement of any prior determined expected return, then $P_{ij}$ is maintained as the optimal policy ($P_{best}$=$P_{ij}$). In an embodiment, DPO program 101 utilizes the policies in decision policies 134 to determine an optimal decision. In an embodiment, DPO program 101 returns the best or most optimal policy $P_{best}$ for a given dataset. In an embodiment, $P_{best}$ is the optimal learned decision policy.

In an embodiment, DPO program 101 determines a reward function R(s,a). In an embodiment, DPO program 101 learns a reward function. For example, the input dataset where state column(s), action column (a) and reward column (r) are known, the output is a model R(s,a) that predicts the reward when applying action (a) in state (s). For example, if $(X_1, \ldots, X_n)$ are the state and action columns and let Y be the reward, DPO program 101 utilizes a AutoAI to learn regression model R(s,a) to return top k models R1(s,a) . . . Rk(s,a).

In an embodiment, a transition model M(s,a) predicts the next state S if applying action A in state S. For example, DPO program 101 receives an input dataset D with state, action, and reward data. In an embodiment, DPO program 101 utilizes AutoAI to learn a multi-variate prediction model and return top k models. For example, model M predicts inventory and demand at next state as a multi-variate prediction model. In an embodiment, the transition model M(s,a) predicts a next state when applying an action (a) to a state(s). In an embodiment the transition model can be selected from a set of candidate models based on a performance metric (e.g., accuracy).

In an embodiment, DPO program 101 generates Q-function candidates. In an embodiment, DPO program 101 receives an input dataset D with state variables $S_i$, action variable $A_i$, and reward variable $R_i$. a dataset D' from D such that it's columns correspond to $S_i$, $A_i$, and $R_i$. In an embodiment, Q1, . . . , Qk is the top k Machine Learning regression pipelines obtained by running an Auto Machine Learning (AutoML) system for regression on dataset D' with target column $R_i$. In an embodiment, Q1, . . . , Qk is the top k neural network architectures obtained by running a NAS (neural architecture search) algorithm for dataset D' with target column $R_i$. In an embodiment, DPO program 101 determines a return of Q1, . . . , Qk together with their parameters $\theta_1, \ldots, \theta_k$. In an embodiment, DPO program 101 determines an output of a set of function approximators that predict $R_i$ given $(S_i, A_i)$.

Figure 2:
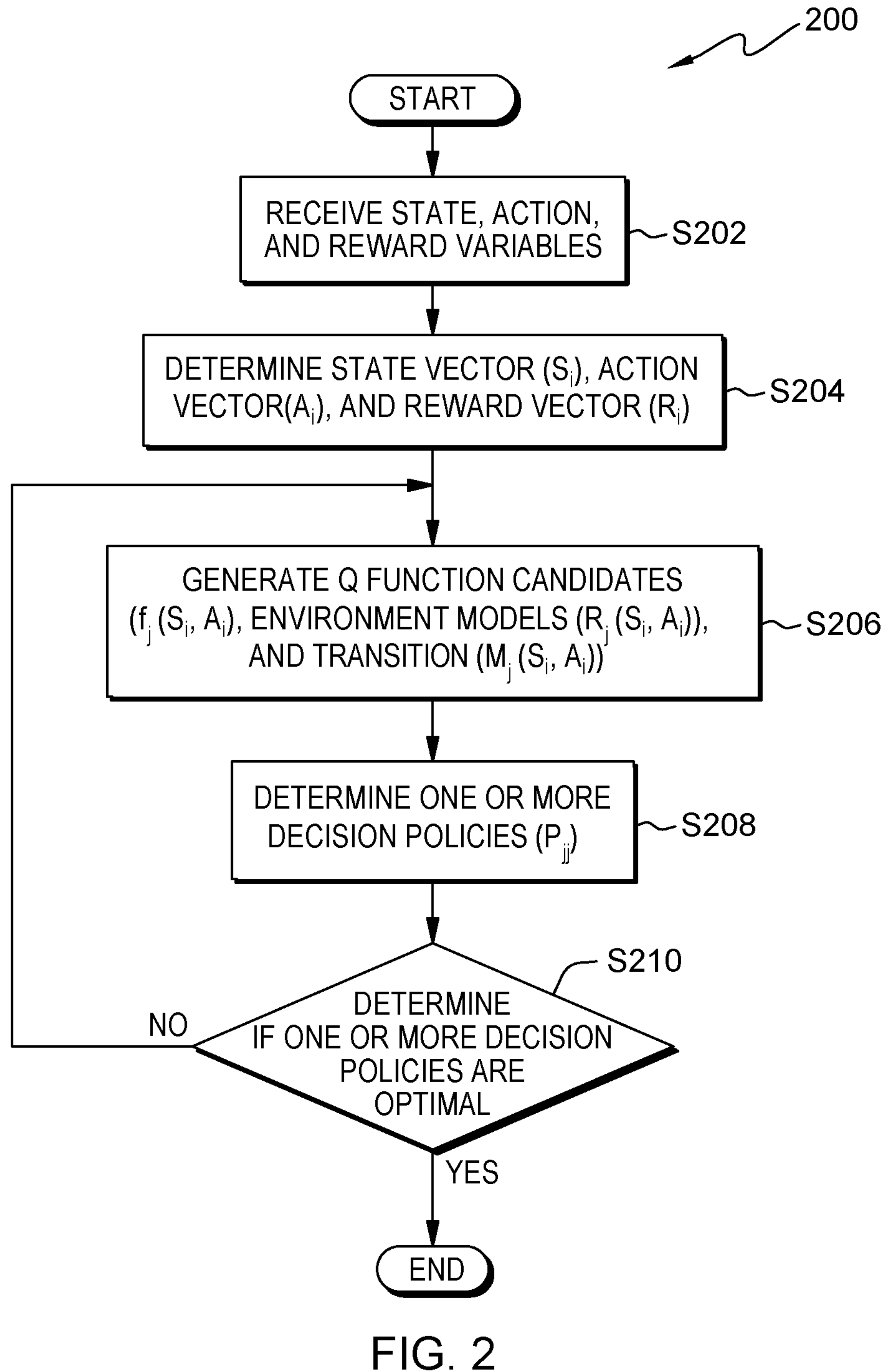
FIG. 2 is a flow chart diagram depicting operational steps for learning optimal decision policies from tabular data, generally designated 200, in accordance with at least one embodiment of the present invention.

FIG. 2 is a flow chart diagram depicting operational steps for learning optimal decision policies from tabular data, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, DPO program 101 receives state, action, and reward variables. In an embodiment, DPO program 101 receives state, action, and reward variables as tabular data. In an embodiment, DPO program 101 selects a subset of columns as state variables, a column as an action variable, and a column as a reward variable. In an embodiment, selection of the state, action, and reward variables is done iteratively.

At step S204, DPO program 101 determines state vector $(S_i)$, action vector $(A_i)$, and reward vector $(R_i)$. In an embodiment, DPO program 101 generates a state vector $(S_i)$, an action vector $(A_i)$, and a reward vector $(R_i)$ based on the tabular dataset. In an embodiment, DPO program 101 automatically generates $S_i$, $A_i$, and $R_i$, which are different from the previous set of data. In an embodiment, $S_i$, $A_i$, and $R_i$ are sets or vectors of columns or variables in the dataset.

At step S206, DPO program 101 generates Q-function candidates $(f_j (S_i, A_i))$, environment models $(R_j (S_i, A_i))$, and transition $(M_j (S_i, A_i))$. In an embodiment, a function approximator Q is learned from the selected columns acting as state variables, an action variable, and a reward variable, and the function approximator Q is applied to a reinforcement learning algorithm to derive an optimal decision policy. In an embodiment, the function approximator Q is selected from the set of candidates based on a performance metric. In an embodiment, a function approximator Q function Q(s, a) is learned from the selected columns acting as state variables, an action variable, and a reward variable, and the function approximator function Q(s, a) is applied to a reinforcement learning algorithm to derive an optimal decision policy.

At step S208, DPO program 101 determines one or more decision policies $(P_{jj})$. In an embodiment, DPO program 101 uses one or more Q-function candidates in a reinforcement learning algorithm to learn one or more decision policies.

At decision step S210, DPO program 101 determines if one or more decision policies are optimal. In an embodiment, DPO program 101 evaluates generated decision policies to identify the most optimal decision policy from a set of generated decision policies. In an embodiment, DPO program 101 determines if there is an improvement of any prior determined expected reward to determine the optimal decision policy. If there are not one or more decision policies that are optimal (decision step S210 "NO" branch), DPO program 101 proceeds to step S206. If it is determined that one or more decision policies are optimal (decision step S210 "YES" branch), DPO program 101 concludes.

Figure 3:
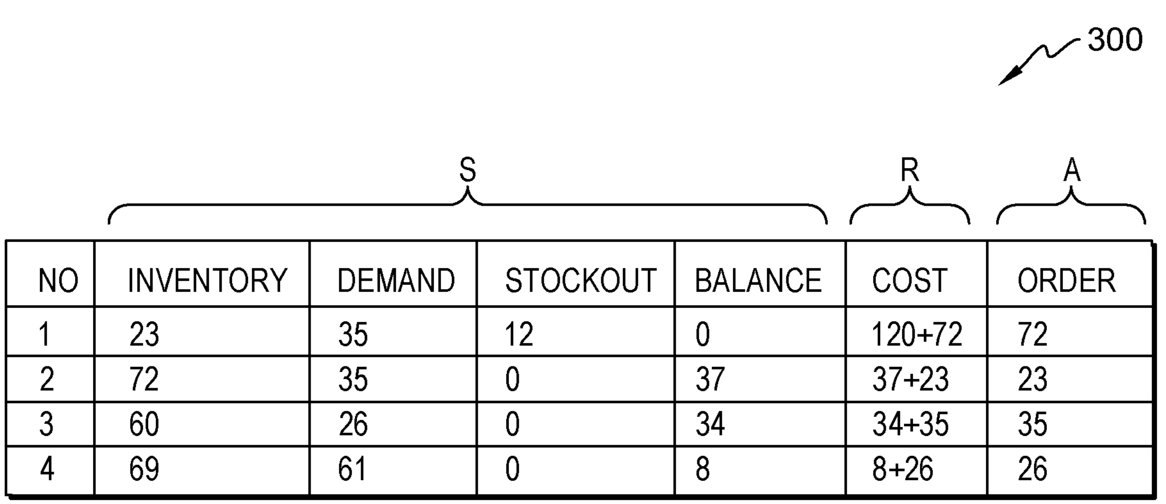
FIG. 3 illustrates an exemplary set of tabular data, generally designated 300, displaying potential state variables, action variables, and reward variables in accordance with at least one embodiment of the present invention.

FIG. 3 illustrates an exemplary set of tabular data, generally designated 300, displaying potential state variable, action variable, and reward variable in accordance with at least one embodiment of the present invention. As depicted in FIG. 3, the set of tabular data is associated with a warehouse inventory. In an embodiment, DPO program 101 automatically selects a set of columns as state variables (S), a column as reward variables (R), and a column as action variables (A). Here, the state variables (S) are the amount of inventory, demand, stockout, and balance. The reward variable (R) is the cost. In this example, the action variable (A) is determinative of how many items need to be ordered. In an embodiment, DPO program 101 trains a machine learning model to predict a reward when applying an action (a) to a particular state (S). In an embodiment, DPO program trains a machine learning model to predict an action when applying a reward (r) to a particular state (s). For example, let $(X_1, \ldots, X_n)$ be the features for the state (S) and action (A) columns, and let Y be the reward. In this example, DPO program utilizes an AutoAI algorithm to learn a regression or multistate variable prediction model R(s,a) to return top k models R1(s,a) . . . Rk(s,a).

Figure 4:
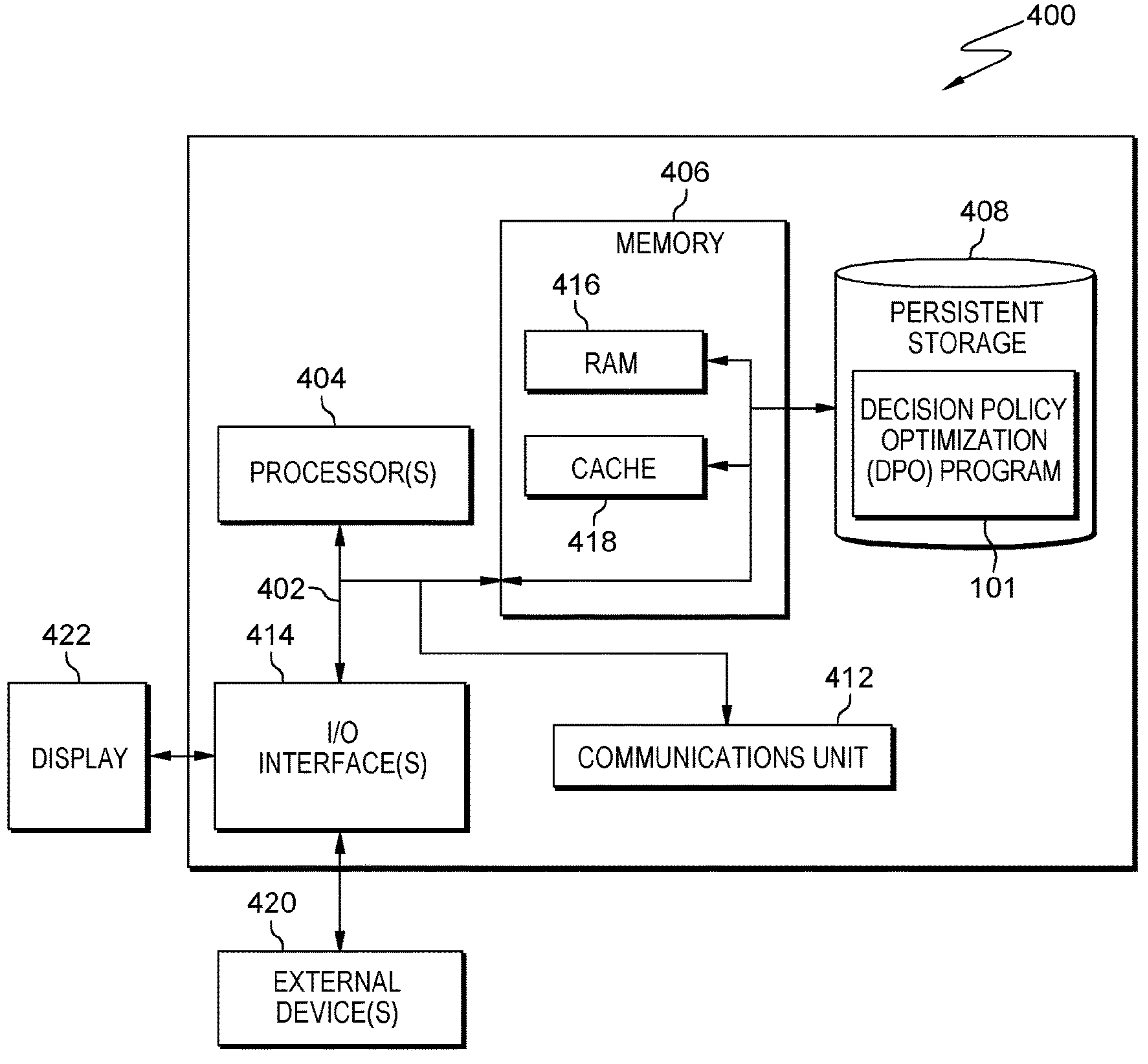
FIG. 4 is a block diagram depicting components of a computer, generally designated 400, suitable for executing a decision policy optimization (DPO) program 101 in accordance with at least one embodiment of the present invention.

FIG. 4 is a block diagram depicting components of a computing device, generally designated 400, suitable for DPO program 101 in accordance with at least one embodiment of the invention. Computing device 400 includes one or more processor(s) 404 (including one or more computer processors), communications fabric 402, memory 406 including, RAM 416 and cache 418, persistent storage 408, which further includes DPO program 101, communications unit 412, I/O interface(s) 414, display 422, and external device(s) 420. It should be appreciated that FIG. 3 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile one or more computer readable storage media.

Program instructions for DPO program 101 can be stored in persistent storage 408, or more generally, any computer readable storage media, for execution by one or more of the respective computer processor(s) 404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 400 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414. I/O interface(s) 414 also can similarly connect to display 422. Display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
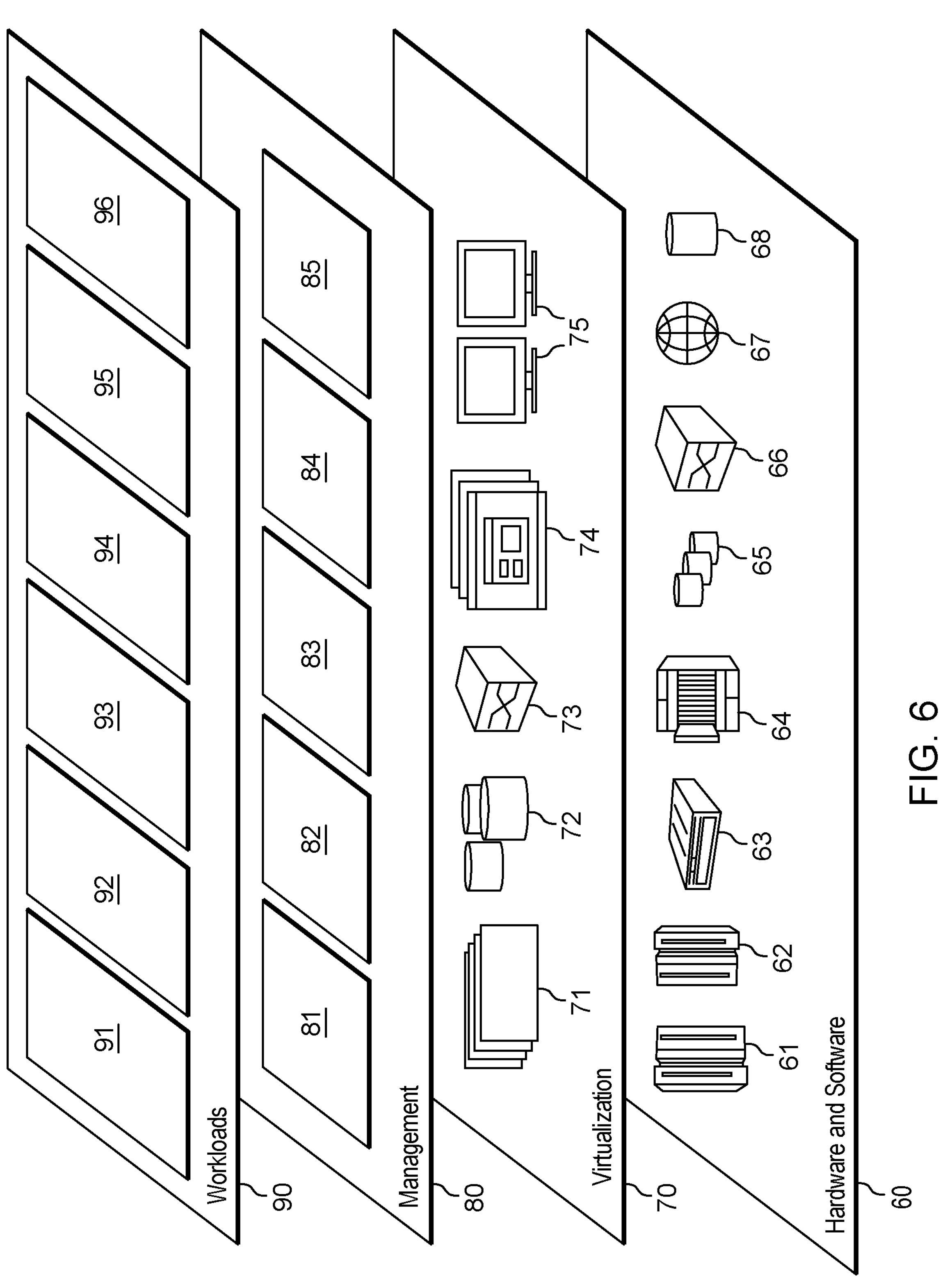
FIG. 6 is a block diagram depicting a set of functional abstraction model layers provided by cloud computing environment 50 depicted in FIG. 5 in accordance with at least one embodiment of the present invention.

FIG. 6 is block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and tabular data based decision policy optimization 96.

We claim:

1. A computer-implemented method for automatically generating optimized decision policies, comprising:

receiving a tabular dataset from a database, wherein the tabular dataset comprises state variables, action variables, and reward variables;

generating Q-function candidates, environments, and transitions by applying a plurality of the state variables, the action variables and the reward variables to a trained regression;

applying the generated Q-function candidates to a reinforcement learning algorithm to learn a decision policy for each of the Q-function candidates;

determining if one or more of the learned decision policies are optimal decision policies based on an outputted expected reward from each of the one or more learned decision policies;

analyzing available policies to determine when there is an improvement of any prior determined expected reward to ensure a selected policy is a most favorable decision policy amongst available policies, wherein the most favorable policies are determined by iteratively selecting a different plurality of state variables, action variables, and reward variables from the tabular dataset;

upon determining that one or more of the learned decision policies are optimal decision policies, generating different Q-function candidates, environments, and transitions by applying the different plurality of the state variables, the action variables, and the reward variables to a trained regression model and selecting a final decision policy, wherein said final decision policy provides prediction of a next best action and/or sequence of actions that improve processing performance, storage capability and time of execution; and executing said final decision policy using an auto machine learning system.

2. The computer-implemented method of claim 1, wherein each of the environments comprise an immediate reward model and a transition model.

3. The computer-implemented method of claim 1, wherein the state variable are one or more columns in the tabular dataset, the action variable are a different column in the tabular dataset and the reward variable are another different column in the tabular dataset.

4. The computer-implemented method of claim 1, wherein the outputted expected reward from each of the one or more learned decision policies is determined using a trained immediate reward model that predicts an expected reward when applying an action in a state.

5. The computer-implemented method of claim 1, wherein a next state is determined using a transition model that predicts a next state when applying an action in a state.

6. A computer program product for automatically generating optimized decision policies, the computer program product comprising one or more computer readable storage media and program instructions stored on the one or more computer readable storage media, the program instructions including instructions to:

receive a tabular dataset from a database, wherein the tabular dataset comprises state variables, action variables, and reward variable;

generate Q-function candidates, environments, and transitions by applying a plurality of the state variables, the action variables, and the reward variables to a trained regression model;

apply the generated Q-function candidates, environments, and transitions to a reinforcement learning algorithm to learn a decision policy for each of the Q-function candidates;

determine if one or more of the learned decision policies are optimal decision policies based on an outputted expected reward from each of the one or more learned decision policies;

analyze available policies to determine when there is an improvement of any prior determined expected reward to ensure a selected policy is a most favorable decision policy amongst available policies, wherein the most favorable policies are determined by iteratively selecting a different plurality of state variables, action variables, and reward variables from the tabular dataset;

upon determining that one or more of the learned decision policies are optimal decision policies, generate different Q-function candidates, environments, and transitions by applying the different plurality of the state variables, the action variables, and the reward variables to a trained regression model and selecting a final decision policy wherein said final decision policy provides prediction of a next best action and/or sequence of actions that improve processing performance, storage capability and time of execution; and execute said final decision policy using an auto machine learning system.

7. The computer program product of claim 6, wherein each of the environments comprise an immediate reward model and a transition model.

8. The computer program product of claim 6, wherein the state variable are one or more columns in the tabular dataset, the action variables are a different column in the tabular dataset, and the reward variables are another different column in the tabular dataset.

9. The computer program product of claim 6, wherein the outputted expected reward from each of the one or more learned decision policies is determined using a trained immediate reward model that predicts an expected reward when applying an action in a state.

10. The computer program product of claim 6, wherein a next state is determined using a transition model that predicts a next state when applying an action in a state.

11. A computer system for automatically generating optimized decision policies comprising:

one or more computer processors;

one or more computer readable storage media; and computer program instructions, the computer program instructions being stored on the one or more computer readable storage media for execution by the one or more computer processors, the computer program instructions including instructions to:

receive a tabular dataset from a database, wherein the tabular dataset comprises state variables, action variables, and reward variables;

generate Q-function candidates, environments, and transitions by applying a plurality of the state variables, the action variables, and the reward variables to a trained regression model;

apply the generated Q-function candidates, environments, and transitions to a reinforcement learning algorithm to learn a decision policy for each of the Q-function candidates determine if one or more of the learned decision policies are optimal decision policies based on an outputted expected reward from each of the one or more learned decision policies;

analyze available policies to determine when there is an improvement of any prior determined expected reward to ensure a selected policy is a most favorable decision policy amongst available policies, wherein the most favorable policies are determined by iteratively selecting a different plurality of state variables, action variables, and reward variables from the tabular dataset;

upon determining that one or more of the learned decision policies are optimal decision policies, generate different Q-function candidates, environments, and transitions by applying the different plurality of the state variables, the action variables, and the reward variables to a trained regression model and selecting a final decision policy wherein said final decision policy provides prediction of a next best action and/or sequence of actions that improve processing performance, storage capability and time of execution; and execute said final decision policy using an auto machine learning system.

12. The computer system of claim 11, wherein each of the environments comprise an immediate reward model and a transition model.

13. The computer system of claim 11, wherein the state variables are one or more columns in the tabular dataset, the action variables are a different column in the tabular dataset, and the reward variables are another different column in the tabular dataset.

14. The computer system of claim 11, wherein the outputted expected reward from each of the one or more learned decision policies is determined using a trained immediate reward model that predicts an expected reward when applying an action in a state.

15. The computer system of claim 11, wherein a next state is determined using a transition model that predicts a next state when applying an action in a state.

* * * * *